United States Patent Office 3,631,163
Patented Dec. 28, 1971

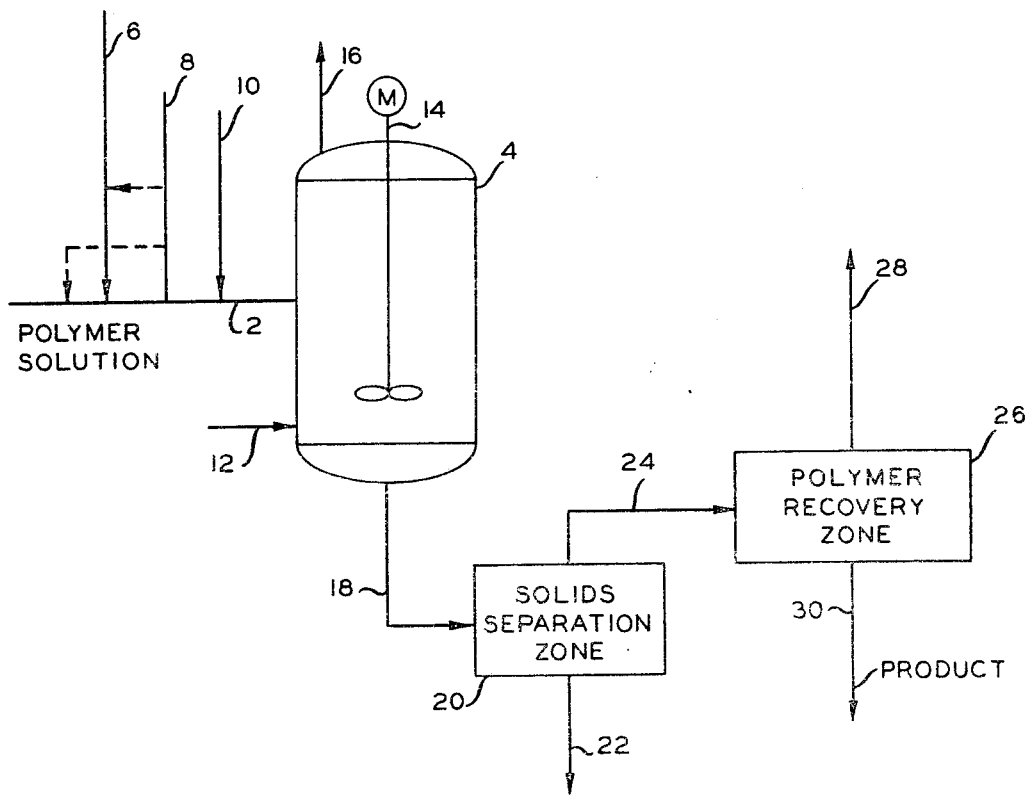

3,631,163
PROCESS FOR THE REMOVAL OF CATALYST RESIDUES IN A POLYOLEFIN TREATING SYSTEM
Donald R. Witt, Bartlesville, Okla., assignor to Phillips Petroleum Company
Filed Feb. 23, 1967, Ser. No. 618,068
Int. Cl. C08f 27/25
U.S. Cl. 260—94.9 GD
5 Claims

ABSTRACT OF THE DISCLOSURE

Removal of catalyst residues from polymer treated in a system utilizing a catalyst formed on mixing a Group VIII metal salt of an organic acid and a Group I–A, II–A or III–A reducing metal compound is improved by addition of a solid adsorbent material prior to the addition of the reducing metal compound.

This invention relates to an improved process for the treatment of polymers of mono-1-olefins having excellent thermal stability. In another aspect, this invention relates to an improved method of treating an olefin polymer to improve its resistance to melt index change at elevated temperatures, whereby catalyst residues therein are substantially reduced.

It has been recently discovered that treatment of 1-olefin polymers with a catalyst system comprising an organometal compound of Group VIII of the Periodic Table and a Group I–A, II–A, or III–A organometallic reducing compound either in the presence or absence of hydrogen converts them to polymers having exceptional thermal stability as evidenced by their ability to exhibit substantially no change in melt index on heating for 60 minutes at 374° F. This treatment does not, however, adversely affect the desirable properties of the resin; for example, its crystallinity, hardness, abrasion resistance, melting point, environmental stress cracking resistance and stress strain properties. However, in the utilization of such a system for the treatment of polymers there is still presented the problem of removal of the catalyst residues from the polymer after termination of the catalytic treatment.

It is thus an object of the present invention to provide an improved process for the catalytic treatment of polymers of 1-olefins wherein catalyst residues are easily removed from the system.

Other aspects, objects and the several advantages will become apparent from a consideration of the disclosure, the drawing and the appended claims.

I have now discovered, in accordance with the present invention that the catalyst residues can be removed from the polymer treated with the above described catalyst system by admixing a finely divided absorbent with the Group VIII organometal component before it is admixed with the Group I–A, II–A, or III–A organometal reducing compound and either before or after it is in contact with the polymer being treated.

As shown in the drawing, a solution of 1-olefin polymer is passed through conduit 2 to reactor 4. Conduit 2 is provided with inlet means 6 wherein a Group VIII metal salt of an organic acid (e.g., nickel octoate) in an inert organic liquid, such as cyclohexane, is introduced. Thereafter adsorbent such as finely ground silica gel is introduced into the stream through conduit 8 and then the reducing agent is added through conduit 10. Alternatively, the adsorbent can be added either to the Group VIII compound or to the polymer solution prior to addition of the Group VIII compound. The resulting mass is thereafter subjected to treatment in reactor 4 wherein hydrogen is optionally introduced through line 12. Agitation is provided by motor driven stirrer 14 although other known agitation means can be used. After reaction, the excess hydrogen, if used, is vented through outlet 16 and the catalyst-containing and treated polymer-containing mixture is removed from the reactor 4 through conduit 18 and passed to solids separation zone 20 which can be a centrifuge, a filter or other known equipment for the removal of solids from liquids at elevated temperatures and pressures. The catalyst is removed through conduit 22 and solid-free polymer mixture is passed through conduit 24 to polymer recovery zone 26 wherein treated polymer is recovered from solution by conventional means such as chilling or evaporation to precipitate the polymer as solid. Recovered diluent is removed through 28 and solid polymer product is recovered through outlet 30.

The adsorbent used can be chosen from among those known to the industry, such as alumina, magnesia, silica, silica-alumina, the synthetic or naturally occurring aluminosilicates, optionally acid-treated, and the like. The adsorbent should have a particle size preferably in the range of about 3 to about 75 microns. Prior to use the adsorbent is heated in a stream of dry air at a temperature in the range of 250–1800° F. to remove adsorbed water.

The present invention is useful in the treatment of any polymer, including homopolymers and copolymers of a mono-1-olefin having 2 to 8 carbon atoms. Examples of such monomers include ethylene, propylene, 1-butene, 1-octene, 4-methyl-pentene-1, and the like. A number of methods of preparing linear polyethylenes of this type are known such as those made by the process described in U.S. Patent 2,825,721. Other known methods employ organometal catalyst systems. It is within the scope of this preferred aspect of my invention to employ polymers in which a 1-olefin such as propylene, butene-1, octene-1, 1,3-butadiene, or the like, preferably mono-1-olefins, are copolymerized with the ethylene.

It is desirable to treat the polymer in solution, preferably while dissolved in a hydrocarbon solvent such as paraffins, cycloparaffins or aromatic or any mixture of these materials. Examples of suitable solvents include n-pentane, n-octane, cyclohexane, benzene, toluene, and the like or mixtures of these. The polymer concentration in the solvent can vary over a relatively wide range, and can be as low as 1 weight percent although concentrations of about 5 to 25 weight percent are preferred.

The catalyst portion of the system which is used employs two components, one being a reducing metal compound which can be represented by the formula $MR_n$ wherein M represents a metal of Group I–A, II–A or III–A of the Periodic System as shown on page B-2 of the Handbook of Chemistry and Physics, 45th Edition, published by the Chemical Rubber Company in 1964, $n$ is the valence of the metal M, and each R is hydrogen or a hydrocarbyl radical having 1 to 20 carbon atoms such as alkyl, cycloalkyl, aryl or combinations thereof, such as aralkyl, alkaryl, alkylcycloalkyl, and the like. Typical compounds representative of this component for the catalyst system include triisobutylaluminum, triethylaluminum, trieicosylaluminum, dicyclohexyl(phenyl)aluminum, 1-anthracenylpotassium, di-3-phenanthrylberyllium, n-butyllithium, dimethylmagnesium, di-n-propylbarium, tri-n-pentylgallium, diisobutylaiumlnum hydride, sodium hydride, aluminum hydride, and the like.

The second component of the catalyst system is a metal salt having the formula

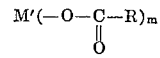

in which M' is a Group VIII metal; R has the same meaning as in the formula for the first component; and $m$ is the valence of M'. The second component is preferably a nickel salt. Typical compounds are nickel stearate, nickel acetate, nickel propionate, nickel formate, nickel octoate, nickel benzoate, nickel naphthenate, and the corresponding iron, cobalt, palladium, and platinum esters such as ferric stearate, cobalt naphthenate, cobalt octoate, and the like. Of this group nickel stearate, nickel octoate, and nickel naphthenate are the presently preferred compounds.

It is preferred to use the nickel salts of organic acids having 5 to 21 carbon atoms, preferably branched, because they are more readily soluble in the treating mixture. Lower molecular weight acid salts, however, such as nickel acetate can be used and one method of improving the physical form of such materials for use in this process is to grind the nickel acetate with mineral oil to form a very fine slurry prior to combining it with the reducing metal compound.

The components of the system for treating the polymer solution are introduced into the treating system as indicated in the discussion of the drawing. The ratio of the reducing metal component to the Group VIII metal compound on a molar basis is generally in the range of 0.1 to 10 and preferably in the range of 0.5 to 5 mols per mol. The concentration of the catalyst in the reaction mixture is generally in the range of 0.001 to 10 weight percent based on the polymer and preferably in the range of 0.002 to 5 weight percent. Greater or lesser amount of catalyst can, however, be used.

The polymer, preferably in solution, is contacted with the catalyst under conditions which include temperatures in the range of about 50 to 500° F. and gauge pressures up to about 1000 pounds per square inch. The reaction time can vary anywhere from 1 minute to 25 hours or more and the reaction can be in either a batch or continuous operation. Preferred conditions are temperatures of 170 to 400° F., pressures of 10 to 500 pounds per square inch gauge and reaction times of about 10 minutes to 10 hours. When treating the polymer in solution the pressure is usually that sufficient to maintain the reaction mixture substantially in the liquid phase.

Hydrogen may or may not be present in the polymer treatment but it is preferred that at least a promoting amount of hydrogen can be used. It is of advantage, of course, to use as little hydrogen as possible but the presence of some hydrogen is advantageous since the time for the reaction can be considerably reduced in this manner. Less than 5 percent of the stoichiometric amount of hydrogen required for hydrogenation of the polymer is sufficient to promote complete modification thereof. However, amounts of hydrogen up to 2 to 10 times the stoichiometric amount required for hydrogenation or more can be used. Also, the conversion can be promoted by pretreating the catalyst with hydrogen prior to the time at which it is contacted with the polymer. It is believed that under these conditions no free hydrogen is present in the reaction mixture with the polymer but the treatment is nevertheless greatly accelerated.

The polymers can be recovered subsequent to the removal of catalyst from the solution in which they are treated by any well known polymer recovery technique such as precipitation of the polymer by cooling or water dilution or by removing the solvent by evaporation.

The polymer is well suited for preparation of articles by conventional extrusion or compression molding processes for the fabrication of items such as fibers, films, gaskets, tubing, cording materials, protective coatings, such as on wire, laminates and the like. The polymer can be compounded with known plasticizers, fillers and other additives such as antioxidants, UV stabilizers, antistatic agents, and the like.

The invention can be further illustrated by the following example.

EXAMPLE I

Polyethylene was made according to process of U.S. 2,825,721, using a chromium oxide catalyst. The resulting polymer had a melt index of 35 and a density of 0.96 g./cc. A series of runs was made utilizing 680 grams of the thus prepared polyethylene dissolved in 6800 ml. of cyclohexane in each run. In runs 1–13 below the catalyst used was nickel octoate (0.32 g., equivalent to 0.054 g. nickel or 80 p.p.m. Ni based on the polymer) and triethylaluminum (TEA) (0.32 g., equivalent to a 3:1 triethylaluminum/nickel octoate mol ratio). In runs 1 to 13 the adsorbent was a silica that had been precalcined in dry air 5 hours at 1300° F. In all runs the polymer hydrogenation was complete in less than 25 minutes, fusing a pressure of 25 p.s.i.g. $H_2$ at a temperature of 300° F. Both the nickel octoate and the triethylaluminum were added as cyclohexane solutions containing about 0.04 g. per cc. In runs 1 to 13 the nickel octoate solution was mixed with the adsorbent and added to the reactor containing the dissolved polymer, followed by the triethylaluminum solution. Following hydrogenation the polymer solution was filtered through a Cuno filter precoated with diatomaceous earth.

In a further run 14, addition of the adsorbent was made just prior to filtration and after introduction of the nickel octoate and triethylaluminum.

The following results were obtained:

| Run No.: | Silica used [a] | $SiO_2/Ni$, wt. ratio | Ni, p.p.m. Unfiltered | Ni, p.p.m. Filtered |
|---|---|---|---|---|
| 1 | None | | 80 | 71 |
| 2 | | 78 | 75 | <4 |
| 3 | Syloid | 42 | 81 | <1 |
| 4 | 404 | 32 | 81 | 2 |
| 5 | | 20 | 82 | 12 |
| 6 | | 70 | 78 | <5 |
| 7 | Syloid | 41 | 84 | <2 |
| 8 | 73 | 32 | 80 | 12 |
| 9 | I.D. #1 | 74 | 72 | 22 |
| 10 | I.D. #2 | 74 | 80 | 2 |
| 11 | Arc | 81 | 74 | 7 |
| 12 | #800 | 39 | 80 | 13 |
| 13 | Arc #70 | 96 | 78 | 36 |
| 14 [b] | I.D. #3 | 161 | 56 | 46 |

[a] Syloid 404 is a dried, ground silica gel prepared by the Davison Chemical Company, and has an average particle diameter of 11 microns. Syloid 73 is a similar material having an average particle diameter of 4 microns. I.D. #1 is dried, ground silica gel prepared by the Davison Chemical Company, and has a particle diameter range of about 100–200 microns. I.D. #2 is a similar material in which the particle diameters are in the range of about 40 to 75 microns. I.D. #3 is a similar material in which the particle diameters are in the range of about 40 to 200 microns. Arc #800 is a very finely-divided silica made by Pittsburgh Plate Glass Company, and has an average particle diameter of 3 microns. Arc #70 is a similar material having an average particle diameter of 2 microns.
[b] This run was made to show that addition of the adsorbent following hydrogenation does not help appreciably in catalyst removal. It differs from the other runs in that about 50 p.p.m. nickel was used (the triethylaluminum/nickel octoate mol ratio was the same), and the silica was precalcined at 500° F.

The above data clearly demonstrate that introduction of adsorbent prior to introduction of the reducing metal compound and preferably having a particle size in the range of 3 microns to 75 microns into the system prior to the addition of TEA results in a significant reduction in the nickel content in the recovered treated polymer product.

As it will be evident to those skilled in the art, various modifications can be made in my invention without departing from the spirit and scope thereof.

I claim:

1. In a process for the treating of polymer of a mono-1-olefin to improve its thermal stability and which comprises contacting said polymer which a catalyst which forms on mixing a reducing metal compound having the formula $MR_n$ wherein M is a metal of Group I–A, II–A or III–A of the Periodic System, $n$ is the valence of the metal M and each R is hydrogen or a hydrocarbyl radical having 1 to 20 carbon atoms, and a Group VIII metal salt of an orognic acid and recovering the polymer thus modified, the improvement which comprises introducing a finely divided adsorbent into said catalyst system prior to the addition thereto of said reducing metal compound so as to permit separation of the catalyst system from the modified polymer prior to recovery of the polymer as a product of the process.

2. A process according to claim 1 in which more than a stoichiometric amount of hydrogen in present, sufficient to saturate said polymer.

3. A process according to claim 1 in which there is present a small but promoting amount of hydrogen substantially less than the stoichiometric amount required to saturate said polymer.

4. A process according to claim 1 in which the adsorbent has a particle diameter in the range of 3 to 75 microns.

5. A process according to claim 1 wherein the polymer is in solution, the catalyst is triethylaluminum and nickel octoate and finely divided silica gel is added to the catalyst system prior to the mixing therewith of the triethylaluminum compound.

References Cited
UNITED STATES PATENTS

| | | | |
|---|---|---|---|
| 2,825,721 | 3/1958 | Hogan et al. | 260—88.1 |
| 3,001,977 | 9/1961 | Wisseroth et al. | 260—93.7 |
| 3,138,579 | 6/1964 | Cabaness | 260—94.9 |
| 3,331,824 | 7/1967 | Folzenlogen et al. | 260—88.2 |

JOSEPH L. SCHOFER, Primary Examiner

S. M. LEVIN, Assistant Examiner

U.S. Cl. X.R.

260—85.3 R, 88.2 S, 93.7